United States Patent
Zomet et al.

(10) Patent No.: US 8,520,060 B2
(45) Date of Patent: Aug. 27, 2013

(54) METHOD AND A SYSTEM FOR CALIBRATING AND/OR VISUALIZING A MULTI IMAGE DISPLAY AND FOR REDUCING GHOSTING ARTIFACTS

(75) Inventors: Assaf Zomet, Jerusalem (IL); Dan Elharrar, Jerusalem (IL); Yael Pritch, Jerusalem (IL); Chanoch Havlin, Jerusalem (IL); Yaron Tadmor, Jerusalem (IL)

(73) Assignee: HumanEyes Technologies Ltd., Jerusalem (IL)

( * ) Notice: Subject to any disclaimer, the term of this patent is extended or adjusted under 35 U.S.C. 154(b) by 935 days.

(21) Appl. No.: 12/528,328

(22) PCT Filed: Feb. 25, 2008

(86) PCT No.: PCT/IL2008/000237
§ 371 (c)(1),
(2), (4) Date: Aug. 24, 2009

(87) PCT Pub. No.: WO2008/102366
PCT Pub. Date: Aug. 28, 2008

(65) Prior Publication Data
US 2010/0066817 A1     Mar. 18, 2010

Related U.S. Application Data

(60) Provisional application No. 60/891,512, filed on Feb. 25, 2007, provisional application No. 60/951,242, filed on Jul. 23, 2007, provisional application No. 60/027,493, filed on Feb. 11, 2008.

(51) Int. Cl.
| | | |
|---|---|---|
| G06T 15/00 | (2011.01) | |
| G09G 5/02 | (2006.01) | |
| G09G 5/10 | (2006.01) | |
| H04N 13/02 | (2006.01) | |
| H04N 13/04 | (2006.01) | |
| H04N 5/232 | (2006.01) | |
| G03H 1/02 | (2006.01) | |
| G02B 21/00 | (2006.01) | |
| G02B 27/22 | (2006.01) | |
| G02B 27/26 | (2006.01) | |
| G02B 27/10 | (2006.01) | |
| G02B 13/06 | (2006.01) | |
| G02B 5/08 | (2006.01) | |
| G06K 9/00 | (2006.01) | |
| G06K 9/74 | (2006.01) | |
| G06K 9/40 | (2006.01) | |
| G03F 1/00 | (2012.01) | |
| A61M 21/00 | (2006.01) | |

(52) U.S. Cl.
USPC ............ 348/51; 345/419; 345/594; 345/690; 348/47; 348/345; 359/3; 359/380; 359/462; 359/463; 359/465; 359/619; 359/626; 359/725; 359/857; 382/112; 382/132; 382/154; 382/212; 382/254; 382/274; 382/285; 430/5; 600/26; 600/27

(58) Field of Classification Search
None
See application file for complete search history.

(56) References Cited

U.S. PATENT DOCUMENTS

| | | | |
|---|---|---|---|
| 3,538,632 A | | 11/1970 | Anderson |
| 5,107,346 A | | 4/1992 | Bowers et al. |
| 5,212,546 A | * | 5/1993 | Arazi et al. .................. 358/518 |
| 5,363,043 A | * | 11/1994 | Xiang et al. .................. 324/309 |
| 5,469,536 A | * | 11/1995 | Blank ........................... 345/594 |
| 5,583,950 A | * | 12/1996 | Prokoski ...................... 382/212 |
| 5,657,111 A | | 8/1997 | Lo |
| 5,737,087 A | | 4/1998 | Morton et al. |
| 5,774,599 A | * | 6/1998 | Muka et al. ................... 382/254 |
| 5,818,975 A | * | 10/1998 | Goodwin et al. ............. 382/274 |
| 5,867,322 A | * | 2/1999 | Morton ......................... 359/619 |
| 6,006,041 A | * | 12/1999 | Mizumaki et al. ........... 396/296 |
| 6,023,557 A | * | 2/2000 | Shaklee ......................... 358/1.5 |
| 6,144,972 A | | 11/2000 | Abe et al. |
| 6,569,580 B2 | | 5/2003 | Campi et al. |
| 6,571,000 B1 | * | 5/2003 | Rasmussen et al. .......... 382/112 |
| 6,573,928 B1 | * | 6/2003 | Jones et al. ..................... 348/51 |
| 6,687,052 B1 | | 2/2004 | Wilson et al. |
| 6,734,847 B1 | * | 5/2004 | Baldeweg et al. ............ 345/419 |

| | | | | |
|---|---|---|---|---|
| 7,043,073 B1* | 5/2006 | Holzbach ............... 382/154 |
| 7,058,252 B2 | 6/2006 | Woodgate et al. |
| 7,130,864 B2 | 10/2006 | Lin et al. |
| 7,190,518 B1* | 3/2007 | Kleinberger et al. ...... 359/465 |
| 7,558,421 B1* | 7/2009 | Holzbach ............... 382/154 |
| 7,995,861 B2 | 8/2011 | Jin et al. |
| 8,144,079 B2 | 3/2012 | Mather et al. |
| 8,264,500 B2 | 9/2012 | Wilensky |
| 2001/0006414 A1* | 7/2001 | Gelbart ................ 355/53 |
| 2001/0043739 A1 | 11/2001 | Oshino et al. |
| 2001/0052935 A1 | 12/2001 | Yano |
| 2002/0069779 A1 | 6/2002 | Baba et al. |
| 2002/0075566 A1 | 6/2002 | Tutt et al. |
| 2002/0191841 A1 | 12/2002 | Harman |
| 2003/0082463 A1* | 5/2003 | Laidig et al. .............. 430/5 |
| 2003/0112523 A1* | 6/2003 | Daniell ................. 359/626 |
| 2003/0223499 A1* | 12/2003 | Routhier et al. ....... 375/240.25 |
| 2003/0234980 A1 | 12/2003 | Montgomery et al. |
| 2004/0012671 A1* | 1/2004 | Jones et al. ............... 348/51 |
| 2004/0024287 A1* | 2/2004 | Patton et al. ............... 600/27 |
| 2004/0125106 A1 | 7/2004 | Chen |
| 2004/0239758 A1* | 12/2004 | Schwerdtner .............. 348/51 |
| 2005/0030409 A1* | 2/2005 | Matherson et al. ......... 348/345 |
| 2005/0069223 A1* | 3/2005 | Tanimura et al. .......... 382/284 |
| 2005/0073530 A1* | 4/2005 | Kapur et al. .............. 345/594 |
| 2005/0083516 A1* | 4/2005 | Baker .................. 356/124 |
| 2005/0111100 A1 | 5/2005 | Mather et al. |
| 2005/0124851 A1* | 6/2005 | Patton et al. ............... 600/26 |
| 2005/0138569 A1 | 6/2005 | Baxter et al. |
| 2005/0190258 A1* | 9/2005 | Siegel et al. ............... 348/47 |
| 2005/0218807 A1 | 10/2005 | Min |
| 2005/0243350 A1* | 11/2005 | Aoyama ................ 358/1.9 |
| 2006/0018526 A1* | 1/2006 | Avinash ................ 382/132 |
| 2006/0038705 A1 | 2/2006 | Brady et al. |
| 2006/0042322 A1 | 3/2006 | Mendoza et al. |
| 2006/0050382 A1* | 3/2006 | Jahrmarkt et al. ......... 359/462 |
| 2006/0092505 A1* | 5/2006 | Abnet et al. ............. 359/380 |
| 2006/0103670 A1 | 5/2006 | Matsumoto |
| 2006/0118036 A1 | 6/2006 | Takeda et al. |
| 2006/0139447 A1* | 6/2006 | Unkrich ................. 348/51 |
| 2006/0170764 A1 | 8/2006 | Hentschke |
| 2006/0291052 A1* | 12/2006 | Lipton et al. ............. 359/463 |
| 2007/0097502 A1* | 5/2007 | Lipton et al. ............. 359/463 |
| 2007/0117030 A1* | 5/2007 | Laidig et al. .............. 430/5 |
| 2007/0121076 A1* | 5/2007 | Klippstein et al. ........... 353/30 |
| 2007/0171037 A1 | 7/2007 | Schofield et al. |
| 2007/0196028 A1* | 8/2007 | Kokemohr et al. ......... 382/254 |
| 2007/0247645 A1 | 10/2007 | Touchard et al. |
| 2008/0012850 A1* | 1/2008 | Keating, III .............. 345/419 |
| 2008/0080773 A1 | 4/2008 | Brady et al. |
| 2008/0117233 A1* | 5/2008 | Mather et al. ............. 345/690 |
| 2011/0311134 A1 | 12/2011 | Wilensky |

FOREIGN PATENT DOCUMENTS

| | | |
|---|---|---|
| EP | 0897126 | 2/1999 |
| EP | 0999463 | 5/2000 |
| EP | 1324587 | 7/2003 |
| JP | 11-149134 | 6/1999 |
| JP | 2001-186549 | 7/2001 |
| JP | 2006-162666 | 6/2006 |
| WO | WO 97/47942 | 12/1997 |
| WO | WO 2004/036286 | 4/2004 |
| WO | WO 2005/091050 | 9/2005 |
| WO | WO 2008/087632 | 7/2008 |
| WO | WO 2008/102366 | 8/2008 |
| WO | WO 2009/013744 | 1/2009 |

OTHER PUBLICATIONS

Communication Pursuant to Article 94(3) EPC Dated Jun. 9, 2010 From the European Patent Office Re. Application No. 08710237.2.
Communication Pursuant to Article 94(3) EPC Dated Jun. 15, 2010 From the European Patent Office Re. Application No. 087702641.5.
Response Dated Oct. 5, 2010 to Communication Pursuant to Article 94(3) EPC of Jun. 9, 2010 From the European Patent Office Re. Application No. 08710237.2.
Response Dated Oct. 13, 2010 to Communication Pursuant to Article 94(3) EPC of Jun. 15, 2010 From the European Patent Office Re. Application No. 087702641.5.
Communication Pursuant to Article 94(3) EPC Dated Jun. 6, 2012 From the European Patent Office Re. Application No. 087702641.5.
Translation of Notice of Reason for Rejection Dated Feb. 7, 2012 From the Japanese Patent Office Re. Application No. 2009-546064.
Official Action Dated Jul. 6, 2012 From the US Patent and Trademark Office Re. U.S. Appl. No. 12/448,894.
Translation of Notice of Reason for Rejection Dated Sep. 28, 2012 From the Japanese Patent Office Re. Application No. 2009-550774.
Official Action Dated Feb. 28, 2013 From the US Patent and Trademark Office Re. U.S. Appl. No. 12/669,495.
Communication Pursuant to Article 94(3) EPC Dated Dec. 20, 2012 From the European Patent Office Re. Application No. 08710237.2.

* cited by examiner

*Primary Examiner* — Ario Etienne
*Assistant Examiner* — Ho Shiu

(57) ABSTRACT

A method for identifying a blur profile of a multi image display with a first image separating mask. The method comprises displaying a calibration pattern through a second image separating mask, allowing an evaluator to provide a visual estimation indicating a blur brought about to the calibration pattern by the second image separating mask, and generating a blur profile of at least the first image separating mask according to the visual estimation. The first and second image separating masks having a substantially similar optical profile.

17 Claims, 8 Drawing Sheets

METHOD AND A SYSTEM FOR CALIBRATING AND/OR VISUALIZING A MULTI IMAGE DISPLAY AND FOR REDUCING GHOSTING ARTIFACTS

RELATED APPLICATIONS

This application is a National Phase Application of PCT Patent Application No. PCT/IL2008/000237 having International Filing Date of Feb. 25, 2008, which claims priority from U.S. Provisional Patent Application No. 60/891,512, filed on Feb. 25, 2007, U.S. Provisional Patent Application No. 60/951,242, filed on Jul. 23, 2007 and U.S. Provisional Patent Application No. 61/027,493, filed on Feb. 11, 2008. The contents of the above Application are all incorporated herein by reference.

FIELD AND BACKGROUND OF THE INVENTION

The present invention, in some embodiments thereof, relates to a system and a method for calibrating and/or visualizing a multi image display and, more particularly, but not exclusively, to a system and a method for calibrating and/or visualizing a multi image display which are based on image separating masks.

In order to meet market demands, multi image displays must conform to the to high quality standards imposed on 2D displays. Users of such spatial displays consider high resolution, robustness, reliability, thickness, low costs, and support of practically all common video formats, including camera and stereo-camera, are essential.

One of the methods for creating a multi image display is achieved by spatial or temporal interdigitation of images and/or partial images. As regards to spatial displays with spatial interdigitation, which may be referred to as multi-view displays, multiple adjoining pixels or their color sub-pixels are grouped to form pixel clusters with each pixel containing a 3D scene from a different perspective, for example see U.S. Pat. No. 6,366,281 Issued on Apr. 2, 2002. An image separating mask, such as a barrier, a lenticular lenses array or other optical element, projects the pixel contents of each pixel cluster into space in a fan-shaped manner. Each fan contains the image content of the 3D scene from a certain perspective. If the two eyes of an observer are located in neighboring fans, the observer perceives the desired stereoscopic representation. However, this arrangement suffers from a low resolution. The overall resolution is not determined by the resolution of the image matrix, but by the coarser pixel cluster resolution. An image with eight perspectives will reduce the resolution to ⅛, for example.

Another method for creating a multi image display is related to the process of manufacturing elements that incorporate image structures that provide a visual motion to portions of the image as the element is tilted, and in particular to systems for generating the motion image elements, see For example U.S. Pat. No. 6,198,544 issued on Mar. 6, 2001.

As regards to multi image spatial displays with temporal interdigitation, for example see Neil A. Dodgson et at.: A 50" time-multiplexed autostereoscopic display, ProcSPIE 3957, "Stereoscopic Displays & Applications XI", light sources are arranged next to each other are projected into the image separating mask that allows the modulation of the projected light. An observer can view the modulated projected light, seeing a different perspective with each eye. Because the projected light represents a scene, which is seen from different perspectives, the observer perceives a stereo image. The same also applies to several observers.

SUMMARY OF THE INVENTION

According to an aspect of some embodiments of the present invention there is provided a method for identifying a blur profile of a multi image display with a first image separating mask. The method comprises displaying a calibration pattern through a second image separating mask, allowing an evaluator to provide a visual estimation indicating a blur brought about to the calibration pattern by the second image separating mask, and generating a blur profile of at least the first image separating mask according to the visual estimation. The first and second image separating masks having a substantially similar optical profile.

Optionally, the evaluator is a system operator.

Optionally, the blur profile includes a convolution kernel.

Optionally, the method further comprises using the blur profile reducing at least one ghosting artifact from the multi image display.

More optionally, the reducing is performed by using the blur profile in a halftoning process.

More optionally, the method further comprises combining the blur profile and a filter used in modeling human visual perception.

Optionally, the method further comprises creating a member selected from a group consisting of: a blur filter, an image blurring transformation, an image conversion function and processing at least one image according to the member.

Optionally, the visual estimation is provided by an image capturing device configured for capturing an image of the calibration pattern and providing the visual estimation according to the captured image.

Optionally, second image separating mask is the first image separating mask.

Optionally, the method further comprises using the blur profile for emulating the appearance of at least one image in a multi-image display.

Optionally, the calibration pattern is printed, the calibration pattern having a printing blur brought about by at least one printing artifact of the optical profile.

More optionally, the at least one printing artifact comprises a member selected from a group consisting of: a specular substrate, ink bleed, ink build, edge acuity, sub-surface scattering in the substrate and gloss non-uniformity.

Optionally, the method further comprises presenting the blur reduced image in the multi-image display.

Optionally, the multi-image display comprises at least one image selected from a group consisting of: at least one interlaced image for lenticular printing, at least one image of a sequence of images depicting a multi-dimensional scene, and at least one image for creating an interlaced image for the multi image display.

Optionally, the image separating mask is selected from a group consisting of: a lenticular lens array, an optical barrier, a parallax barrier, an array of lenses for integral photography, and any display for displaying a multi dimensional image.

Optionally, the method further comprises receiving location information of the evaluator before the c), the generating being performed according to the location information.

Optionally, the calibration pattern comprises at least one location label, the allowing further comprises allowing a location estimation of the location information according to the visibility of the at least one location label from a certain location.

Optionally, the calibration pattern comprises a banding pattern, further comprises generating a banding profile configured for calibrating at least one image of the multi image display according to the visual estimation.

According to an aspect of some embodiments of the present invention there is provided a method for reducing artifacts of a multi image display. The method comprises displaying a calibration pattern through an image separating mask, allowing an evaluator to provide a visual estimation indicating a multi image display artifact brought about by the image separating mask, and processing a content image according to the visual estimation, thereby reducing the multi image display artifact.

Optionally, the calibration pattern is a banding profile, the allowing comprises allowing the calibration of the image separating mask in relation to the content image.

Optionally, the artifact is selected from a group consisting of: a ghosting artifact, a bleed artifact, an edge acuity artifact, a banding artifact, and a gloss non-uniformity artifact.

According to an aspect of some embodiments of the present invention there is provided a method for visualizing a multi image display. The method comprises displaying a calibration pattern through an image separating mask, allowing a visual estimation of a blur brought about by image separating mask, processing at least one image according to the visual estimation, and displaying the at least one processed image, thereby visualizing an appearance of the at least one image through the image separating mask.

Optionally, the blurring comprises generating a blur profile according to the visually estimation and using the blur profile for processing the at least one image.

Optionally, the displaying is performed using a simulation module configured for simulating an appearance of the calibration pattern through the image separating mask.

Optionally, the method further comprises receiving the visual estimation from an image capturing device before the processing.

According to an aspect of some embodiments of the present invention there is provided a system for identifying for a blur profile of a multi image display. The system comprises an input module configured for receiving a visual estimation of a blur brought about to a calibration pattern by at least an image separating mask, a calibrating module configured for generating the blur profile according to the visual estimation, and an output unit for outputting the blur profile, thereby allowing at least one of reducing a ghosting artifact of the multi image display and visualization the multi image display.

Optionally, the image separating mask having an optical profile, the multi image display having an additional image separating mask having the optical profile, the multi image display being formed by displaying the at least one calibrated image through the additional image separating mask.

More optionally, the optical profile is configured for defining a member selected from a group consisting of a pitch, a curvature, a refractive index shape, a relative location of the lenticular lenses, a transparency and the like.

Optionally, the system further comprises a client interface configured for generating a visualization of the multi image display and sending the visualization to a client terminal via a network, thereby allowing a user to view the visualization.

More optionally, the client interface is configured for receiving a generation authorization from the user via the network and generating the multi image display according to the generation authorization.

More optionally, the client terminal is remotely located from the system.

Optionally, the multi image display comprises at least one image is selected from a group consisting of at least one interlaced image for lenticular printing, at least one image of a sequence of images depicting a multi-dimensional scene, and at least one image for creating an interlaced image for the multi image display.

According to an aspect of some embodiments of the present invention there is provided a method for de-ghosting a multi image display having at least one image and a first image separating mask. The method comprises displaying a calibration pattern through an image separating mask, allowing a visual estimation of a blurring artifact brought about by a second image separating mask, and processing the at least one image according to the visual estimation, thereby reducing a ghosting artifact brought about at least by the first image separating mask. The first and second image separating masks having a substantially similar optical profile.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
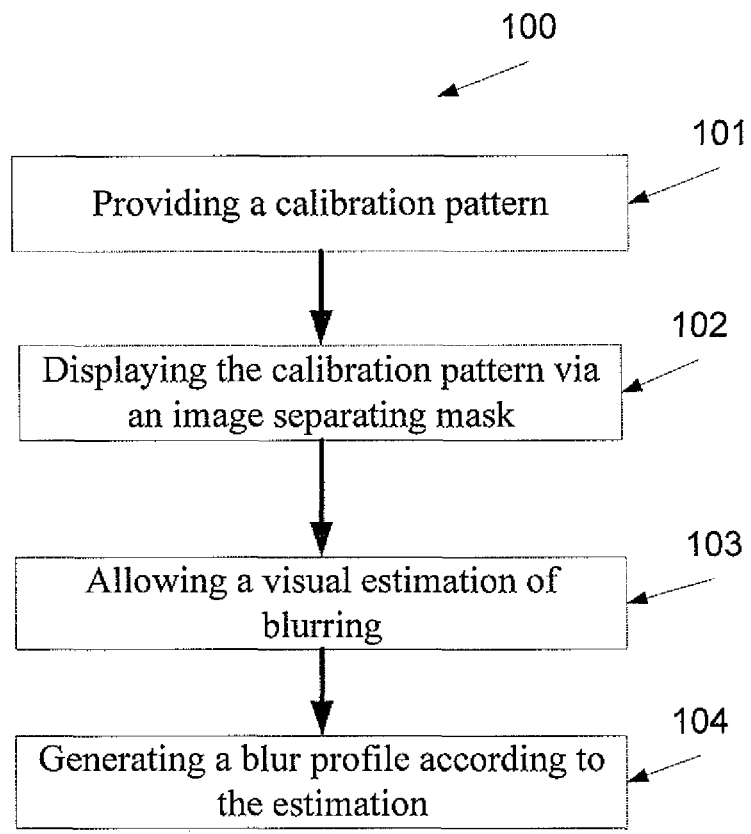
FIG. 1 is a flowchart of a method for calibrating a multi image display, according to some embodiments of the present invention.

The present invention, in some embodiments thereof, relates to a system and a method for calibrating and/or visualizing a multi image display and, more particularly, but not exclusively, to a system and a method for calibrating and/or visualizing a multi image display which are based on image separating masks.

According to some embodiments of the present invention there is provided a method and a system for identifying one or more degradation profiles, such as a blur profile, that may be used for calibrating a multi image display. The method is based on a calibration pattern that is displayed to an evaluator, such as a system operator or an image capturing device, through a certain image separating mask. As used herein as an image separating mask means a lenticular lenses array, a parallax barrier, a multi image display screen, an array of lenses for integral photography (IP), for example as described in U.S. Pat. No. 5,800,907, filed on May 23, 1996 that is incorporated herein by reference and any display for displaying a multi dimensional image. Such a display allows the evaluator to provide a visual estimation of the blur that is brought about at least by an image separating mask. The blur may also be affected by printing artifacts, paper quality, and in some embodiments, artifacts which are related to an element that projects or displays one or more images via the image to separating mask. The visual estimation is based on the appearance of the calibration pattern and/or elements thereof. Now, after the visual estimation is provided, the degradation profile, which is optionally the blur profile, is generated according to the visual estimation. The blur profile is designed for calibrating one or more images which are displayed through the same image separating mask or one that has the same optical profile as the image separating mask which has been used during the aforementioned visual estimation. It should be noted that such a method may be used for identifying a blur profile that is adjusted to a certain optical profile of a specific image separating mask. Furthermore, such a method may also be used for identifying other optical, display, and/or printing profiles, such as banding profile, which are adjusted according to optical aberrations which are brought about by the specific image separating mask or according to printing artifacts which are brought about by the printing and/or copying device that is used for generating calibrated images. It should be noted that such an embodiment may be used for calibrating a printer and/or a copier of a multi image display article.

According to some embodiments of the present invention there is provided a method and a system for visualizing a multi image display. In a similar manner to the outlined above, this method is based on a calibration pattern which is displayed to an evaluator through an image separating mask. The displaying allows the evaluator, as outlined above and described below, to visually estimate artifacts which are brought about by an image separating mask. Now, the visual estimation is used for simulating the blur occurring within the display when displaying images which are designed to be displayed via the image separating mask or a via a similar image separating mask. The blurring allows the displaying of the images in a manner that visualizes the appearance thereof through the image separating mask. As used herein, blurring means adding blur to the images, mixing the images in a way that creates ghosting artifacts, for example by overlaying one or more images on one or more other images, and/or mixing the strips of an interlaced image or overlaying features of one strip of an interlaced image on another strip of the interlaced image. Optionally, when the multi image display is a lenticular image, the blurring effect is achieved by blurring the interlaced image or any other processing that creates a weighted overlay of the images.

Such a method allows emulating the appearance through the image separating mask of the interlaced image or any other image format that combines of the images. A user, such as a customer, an editor, and a photographer, may upload an interlaced image to a remote server, such as a web server, optionally using a client terminal, such as a personal computer, and the remote server may use the blur profile for blurring the uploaded interlaced image to create the emulation images. Optionally, the user may upload images which are interlaced by the remote server, optionally before the aforementioned blurring. Optionally, the user may upload information that is used by the remote server or another server to create interlaced images. The blurring is performed to emulate the appearance of a multi image display that is based on these images. The blurred images or any product or segment thereof is retrieved to the user, optionally allowing her to preview the multi image display artifacts on her personal client terminal. Such a preview may allow the user to approve the printing and/or the copying and/or display of the multi image display without seeing it. Such an embodiment may facilitate the ordering of a multi image display using the Internet, for example using a website.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a flowchart of a method 100 for identifying a blur profile of a multi image display with an image separating mask, according to some embodiments of the present invention. As used herein, an image separating mask means a lenticular lens array, an optical barrier, a parallax barrier, and/or any other display panel for displaying multiple images, such as stereoscopic images. Optionally, the image separating mask has a vertical and/or a horizontal structure, optionally periodic, for channeling images in a plurality of directions.

The method allows identification of a blur profile, which may be used for creating a blurring image transformation. In one embodiment, the blurring transformation is implemented by convolving the interlaced images with a blur filter, such as a Gaussian or Lorentz distribution based filter, or any other conversion that is based on one or more visually and/or optically evaluated measurements. In other embodiments, the blurring image transformation is implemented by mixing strips of an interlaced image or by mixing the images designated for display as a weighted average, for example as described in relation to equation 2 below.

For brevity, such a blurring image transformation, or any other conversion may be referred to herein as a blur profile. The blur profile represents the blur that is brought about by at least an image separating mask and optionally printing artifacts.

Paper quality, and in some embodiments artifacts which are brought about by a displaying element and/or a projecting element. First, as shown at 101, a calibration pattern is provided. As further described below, a number of calibration patterns may be used. Then, as shown at 102, the calibration pattern is displayed in the multi image display, for example through an image separating mask to a user and/or to an image capturing device, such as a camera. This display allows the user and/or to the image capturing device to visually estimate characteristics, such as intensity or visibility, of one or more features that indicates the blur and/or geometry that is brought about by at least an image separating mask, as shown at 103, optionally as described below. As used herein an image capturing device means a digital camera or any other device that uses an image sensor, such as charge coupled device (CCD) sensor and a complementary metal oxide semiconductor (CMOS) sensor, for capturing a digital image. Now, as shown at 104, a blur profile is created according to the visual estimation of the printed templates. Optionally, the blur profile is defined as a convolution kernel. Such a blur profile may be used for blurring and/or de-blurring, which may be understood herein as de-ghosting, one or more interlaced images or any other image or a segment thereof that is, designated to be displayed in the multi image display. An example for such an interlaced image is an interlaced image for lenticular printing that depicts a scene from a number of angles and/or a motion of one or more objects. Another example is an interlaced image for a sequence of images that depict a three-dimensional (3D) scene that is projected on the image separating mask display, for instance see Wojciech Matusik et al. 3D TV: A Scalable System for Real-Time Acquisition, Transmission, and Autostereoscopic Display of Dynamic Scenes, Mitsubishi Electric Research Laboratories, Cambridge, Mass., which is incorporated herein by reference. For clarity, a 3D scene my be understood herein as a scene that depicts one or more objects from a number of angles and/or a motion in or of one or more objects and/or a flipping between at least two different images.

The method may be used for de-blurring a 3D display of dynamic and static 3D scenes. As used herein, a 3D scene means a scene that is displayed in three dimensions along a period and/or a scene that is displayed from a number of point of views (POVs). Optionally, the 3D scene is a static scene, for example a scene that is depicted by an interlaced image that is printed on and/or attached in front of the image separating mask. Optionally, the 3D scene is a dynamic scene, for example a 3D scene that is projected on the image separating mask display, see Wojciech Matusik et. Al. 3D TV: A Scalable System for Real-Time Acquisition, Transmission, and Autostereoscopic Display of Dynamic Scenes, Mitsubishi Electric Research Laboratories, Cambridge, Mass., which is incorporated herein by reference. Optionally, the 3D scene is a dynamic scene in which a plurality of different videos is displayed, each video being displayed to a different angle.

Optionally, the blur profile is used for emulating one or more images that visualize the views displayed by a multi image display which achieved using the image separating mask. Such a visualization, which may be displayed to a user on a 2D display, such as a screen of a personal computer or any other client terminal, and/or printed on a lenticular lenses array and/or a commonly used printing media, allows the user see how a still image and/or a sequence of images may be look like through a image separating mask and/or when projected on an image separating mask.

Figure 2:
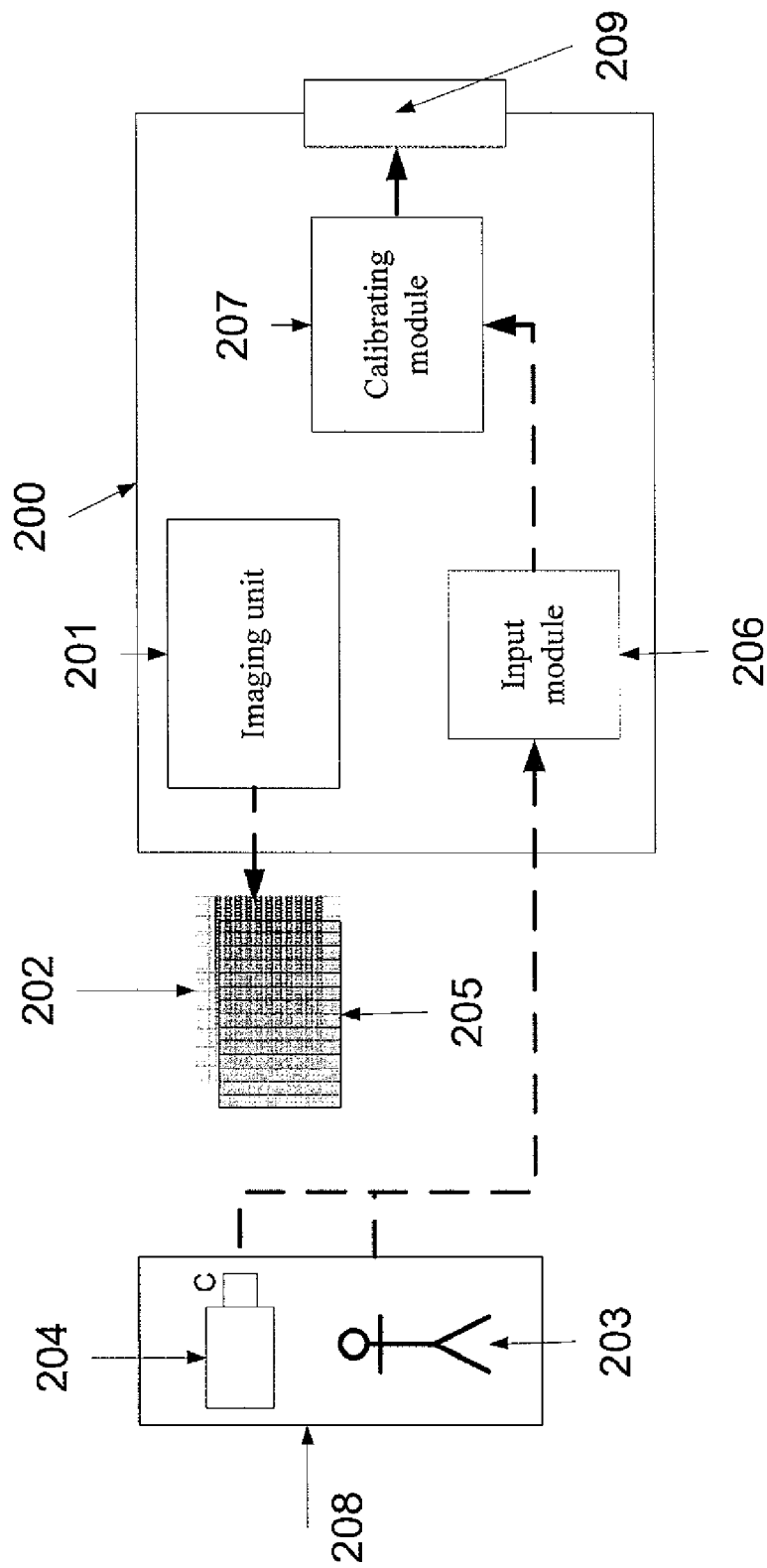
FIG. 2 is a schematic illustration of a system for calibrating one or more images for a multi image display, according to some embodiments of the present invention.

Reference is now also made to FIG. 2, which is a schematic illustration of a calibrating system 200 for identifying a blur profile for de-ghosting and/or blurring one or more images for a multi image display, according to some embodiments of the present invention. The calibrating system 200 optionally comprises an imaging module 201 for displaying, through or on an image separating mask 205, a calibration pattern 202. The calibration pattern may be printed and/or displayed on a display, allowing the evaluation thereof 205. The calibration pattern 202 is displayed, to an operator 203 and/or to an image capturing device 204, which may be referred to, jointly or separately, as an evaluator 208. The calibration pattern 202 allows the evaluator 208 to estimate visually characteristics, such as intensity or visibility, of one or more features that indicates the blur that is brought about by the image separating mask 205 Optionally, as further described below, the calibrating system 200 includes a calibrating module 207 for estimating a blur profile according to the visual estimation of the user. The calibrating system 200 further comprises an input module 206 for allowing the evaluator 208 to input the aforementioned visual estimation. Optionally, the evaluator is a human operator 203, which is referred to herein as an operator 203, and the input module 206 includes a user interface that is displayed to the human operator 203 on a display unit, such as a screen. Optionally, the user interface is a graphic user interface (GUI) that allows the operator 203 to indicate on one or more artifacts that appears on the displayed calibration pattern 202. Optionally, the GUI includes an element for each artifact. For example, the GUI includes a number of sliders, each designed for allowing the user to indicate on one or more visual measurements. The visual estimation of the evaluator may be used to set one or more adjustments to one or more images that is configured for to be displayed through the image separating mask 205, for example as outlined above and/or described below.

The calibrating system 200 further comprises a calibrating module 207 for calculating a blur profile according to the visual estimation of the user, optionally as outlined above and described below. The calibrating module 207 output the blur profile, optionally via an output module 209 to an adjusting module (not shown) for de-ghosting and/or blurring still and/or video images or their interlace according to the blur profile. The still and/or video images are designed to be displayed through the image separating mask or through an image separating mask that have one more similar properties. For example, with an image separating mask that has similar properties such as pitch, curvature, refractive index, relative location of the lenticular lenses, transparency and the like. Optionally, the calibrating module 207 uses the estimations of the user for creating a blur profile that takes into account blur that is brought about by the image separating mask and in addition other elements and/or features. For example, when the calibration pattern is printed and attached to an image separating mask, the user visually estimates characteristics, such as the intensity or the visibility of one or more features in a multi image display with a blur that is brought about also by properties such as printer resolution, type of substrate, type of specular substrate, type of ink, type of ink bleed, type of ink build, edge acuity, and room temperature during printing. The adjustment is made according to the one or more visual evaluations which are provided by the evaluator 208.

Figure 3:
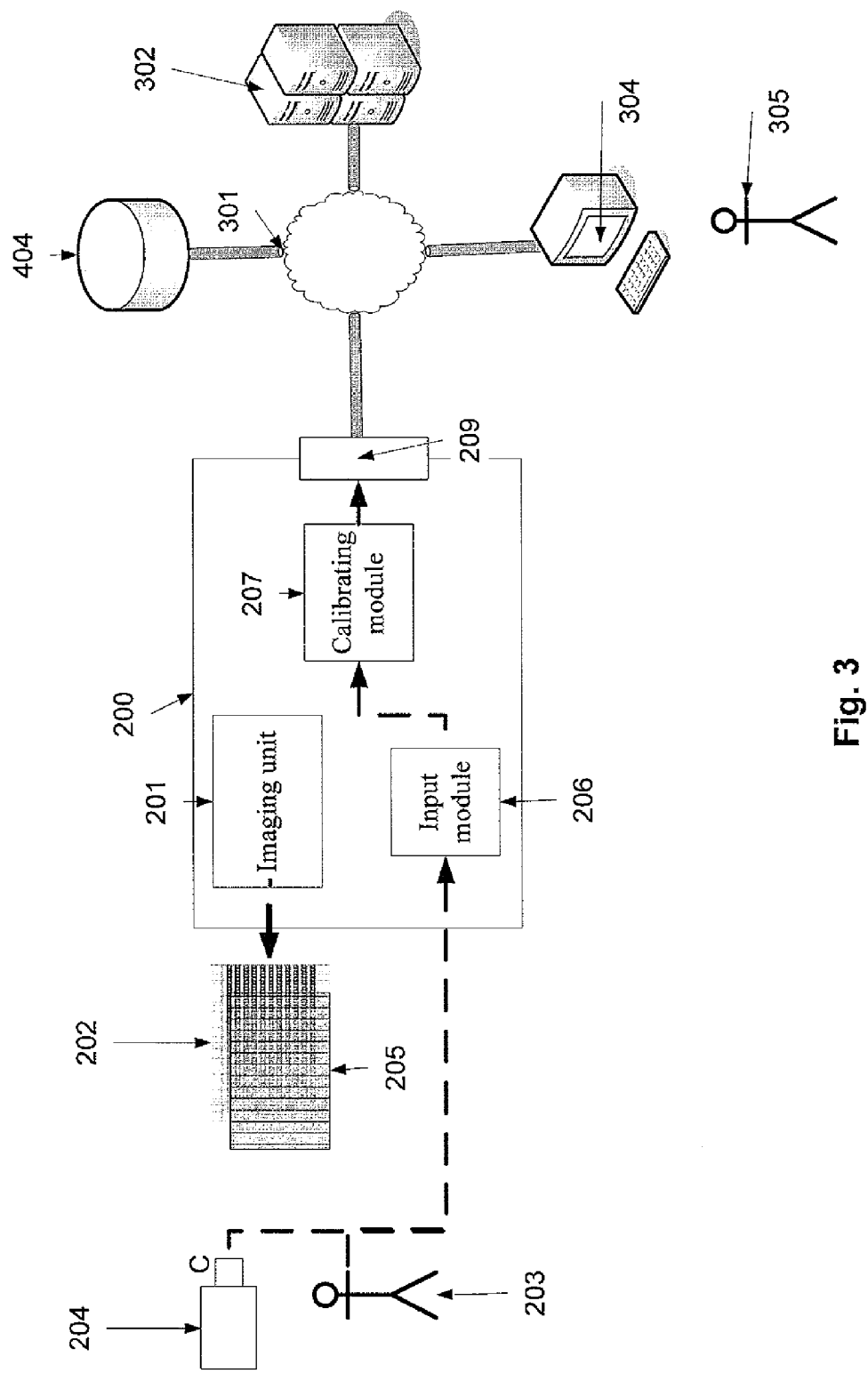
FIG. 3 is a schematic illustration of a distributed system for calibrating one or more images for a multi image display, according to some embodiments of the present invention.

Reference is now made to FIG. 3, which is a schematic illustration of a connection between the calibrating system 200, an adjustment server 302, and a client terminal 304 blurring, according to some embodiments of the present invention. The components of the calibrating system 200 and the evaluator 208 are as depicted in FIG. 2, however FIG. 3 depicts a distributed system in which the calibrating system 200 the adjustment server 302 and the client terminal 304 are connected through a computer network 301, such as the Internet and/or an Ethernet. In such an embodiment, the evaluator 208 may use a client terminal that is connected to the computer network 301, such as a personal computer, and hosts or accesses the input module 206 for inputting a visual evaluation of the displayed calibration pattern 202, for example as described below. As described above, the calibrating system 200 may be used for visualizing a multi image display of the images which are displayed through the image separating mask 205, or a similar image separating mask. Optionally, the calibrating system 200 is connected to a client terminal 304 that displays the visualization to a user. In such an embodiment, the system 100 may define a blur profile that is applied on content of multi-image display that is selected by the user 305. Optionally, the calibrating system 200 provides the blur profile to a web server that hosts a website. The website allows the user 305 to visualize, using the client terminal 304, an image or a sequence of images that she selects and/or uploads. The visualization allows the user to watch the selected and/or uploaded images as if they have been displayed through the image separating mask or a similar image separating mask. Optionally, the system is connected to a database 404 that is used for storing the uploaded images and/or other images, optionally interlaced, which are designed to be displayed in a multi image display. The blur profile, which is generated by the calibrating module 207 according to the inputs of the evaluator 208, is used for blurring the selected and or uploaded one or more images and makes them available for the user 305 through the client terminal 304.

In such an embodiment, a creator of one or more scenes, such as a 3D movie or clip, can use the system to edit the multi-view content without actually projecting or displaying the multi-view content on an image separating mask or without actually fixating the multi-view content as a multi-view display.

In such an embodiment, a creator of a graphic content, such as 305, may see a visualization of one or more multi image display articles which are based on the graphic content that she selected and/or uploaded and uses her client terminal 304 for producing, printing, and/or copying a multi image display that is based on the selected and/or uploaded content. The adjusting server 302 adjusts the selected and/or uploaded images according to the blur profile and uses a device, such as a printing device and/or a copying device for generating the multi view display for the creator 305.

Optionally, the display is a printed article and the visualization is calculated according to the properties of the specific printing and/or copying device that is used for printing and/or copying the multi image display articles, for example according to one or more printing artifacts which are brought the specific printing about by the printing and/or the copying device. Optionally, the visualization is calculated according to the more printing artifacts which are caused by printing and/or copying media. For example, a printing artifact may be a bleed artifact, an edge acuity artifact, a banding artifact, and a gloss non-uniformity artifact. Optionally, a printing artifact profile is created by the calibrating module 207 and used for adjusting the aforementioned visualization.

It should be noted that the visualization may take various forms, for example by creating one or more animations of the multi image display articles and/or one or more one or more anaglyph images which are adjusted according to the blur profile and optionally according to the printing artifact profile. Optionally, the animations and/or the anaglyph images are outputted as printouts, screen displays, and/or any other form of displaying one or more selected and/or uploaded images and/or anaglyph images. For example, see U.S. Pat. No. 6,389,236, issued on May 14, 2002, which is herein enclosed by reference.

Figure 4:
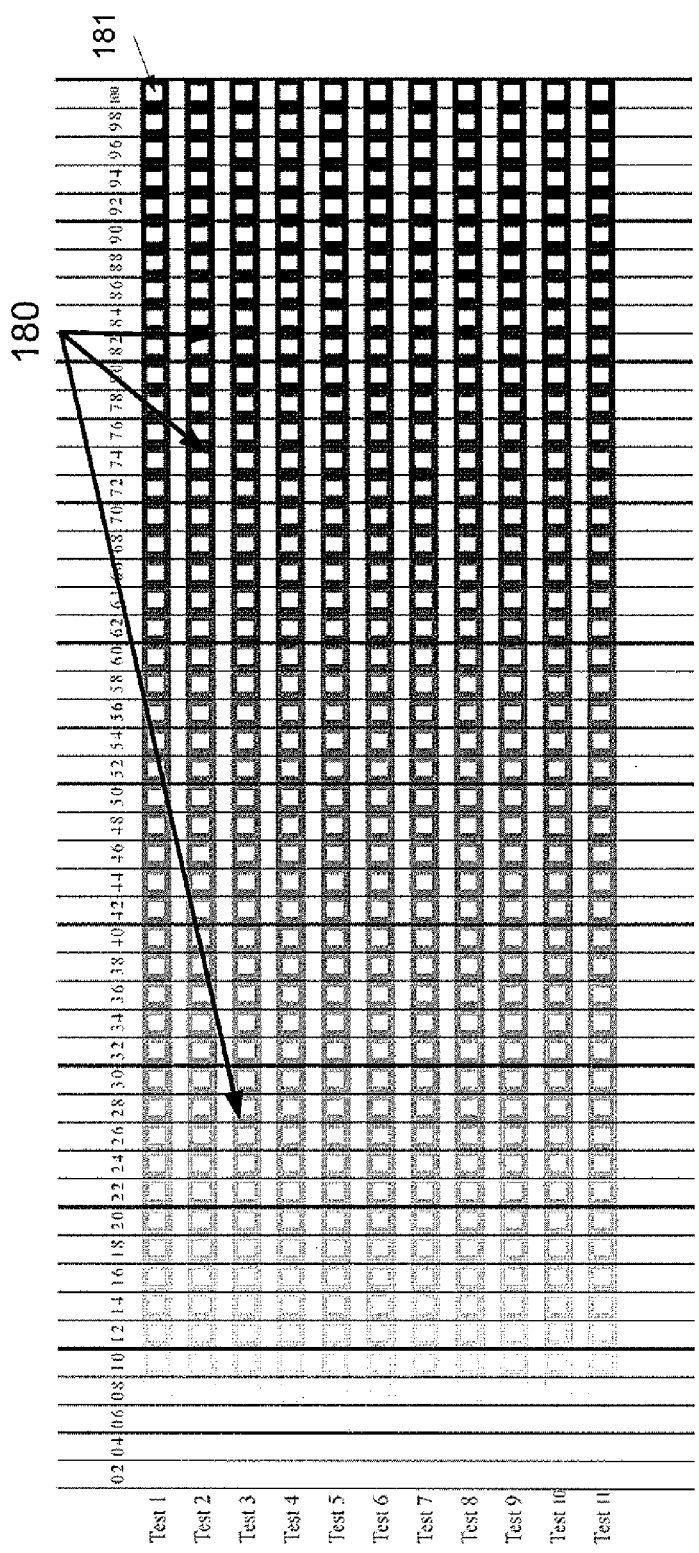
FIG. 4 is an exemplary calibration pattern template, according to some embodiments of the present invention.
Figure 5:
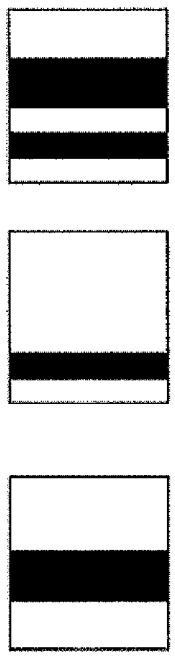
FIG. 5 is a schematic illustration of exemplary changeable calibration tiles which are designed to be placed within the calibration pattern template, according to some embodiments of the present invention.

Reference is now made, once again, to FIG. 2 and to FIG. 4, which is an exemplary calibration pattern template and to FIG. 5 that depicts schematic exemplary changeable calibration tiles which are designed to be placed within the calibration pattern template, according to some embodiments of the present invention. As described above, a user and/or an image capturing device are used for evaluating the blur that is brought about by a certain image separating mask on the basis of the exemplary calibration pattern.

In some embodiments of the present invention, the imaging unit 201 prints the calibration pattern in a substantially similar manner to the printing of one or more interlaced images which are used for creating the multi image display articles. The calibration pattern is placed on the back side of a lenticular lenses array or any other image separating mask that is similar or substantially similar to the aforementioned image separating mask. Each white square of the calibration pattern, for example shown at 181, is replaced with a changeable calibration tile, for example as shown at FIG. 5. The evaluator 208 captures or views the clarity of the changeable calibration tiles through the image separating mask, and identifies, in each row, the column in which the changeable calibration tile is indistinguishable from the related surrounding frame. Optionally, the calibration pattern is printed directly on the back side of the image separating mask or on a media that is placed closed to the back side of the image separating mask, optionally in a similar manner to the manner that the final interlaced images are printed.

Optionally, the changeable calibration tiles contain a non-white segment in at least one view, and white segments in the rest of the views. For clarity, it is assumed that there are n possible views displayed by the image separating mask and that the content of the calibration tiles may represented by a vector E of n values which correspond with the respective views in the image separating mask. In some embodiments, the calibration tiles are defined as follows:

$$E_1=[1,0,0,0,\ldots],E_2=[0,1,0,0,\ldots],$$
$$E_3=[0,0,1,0,\ldots],E_n=[0,0,0,1,\ldots]$$

where 1 denotes a black segment and 0 denotes a white segment. In such a manner, each tile contains absolute black in one view and absolute white in all the other views. The number of tiles is equal to n, the number of views. In other embodiments, the calibration tiles are defined as follows:

$$E_1=[0.8,0.1,0,0,\ldots 0.1],E_2=[0.1,0.8,0.1,0,0,\ldots$$
$$],E_3=[0,0.1,0.8,0.1,0,\ldots],$$
$$E_n=[0.1,0,\ldots,0,0.1,0.8]$$

where each value represents the gray level of a respective segment. In such a manner, each tile may contain segments with different gray levels, each seen from a different view.

Optionally, the calibration pattern depends on the print effects that need to be simulated. FIGS. 4 and 5, for example, simulate inter-views and intra-views blurring effects. The measurement process consists of a set of measurements, each associated with a test. FIG. 4 depicts an example of six tests and/or measurements. For each test, a different pattern is printed within borders of different intensities, as shown at 180. Once the pattern is placed at the back of the image separating mask, the evaluator 208 identifies, for each test and/or row, the column for which the effect of image separating mask causes the internal rectangle to have the same apparent intensity as the surrounding boundary. If several such columns exist, the evaluator 208 may pick one of the columns, for example the median column; or provide all columns as an output. This column represents the estimated quality of the lenticular intensity of the test, as if the evaluator 208 measures intensity.

Figure 9:
FIG. 9 is a schematic illustration of an exemplary calibration pattern template to having separable artifact identifiers, according to some embodiments of the present invention.
Figure 10:
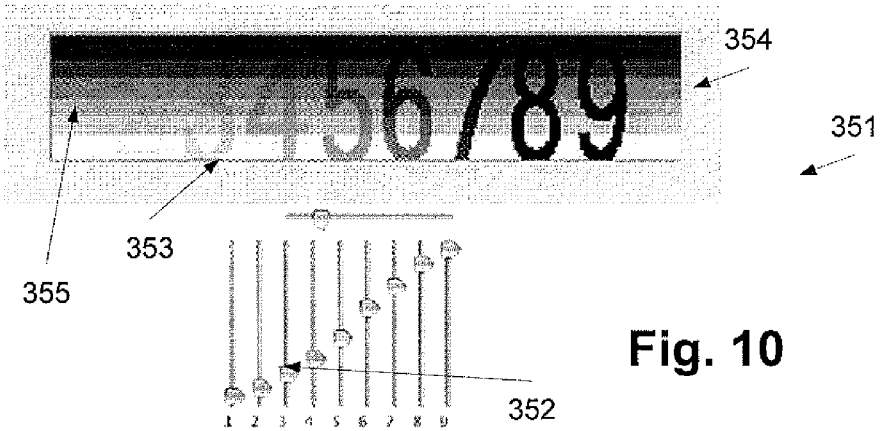
FIG. 10 is a schematic illustration of a graphical user interface (GUI) for adjusting a blur profile, according to some embodiments of the present invention.

Reference is now made, once again, to FIG. 2 and to FIGS. 9-10, which are schematic illustrations of respectively an exemplary calibration pattern template 350 having separable artifact identifiers, which may be referred to herein as an artifact calibration template 350 and a GUI 351 for adjusting a blur profile according to the exemplary calibration pattern template 350, according to some embodiments of the present invention. The separable artifact identifiers of the exemplary calibration pattern template 350 are nine digits. The operator is asked to view the digits through the multi-view display and to adjust the perceived intensity thereof by using the sliders 352 for adjusting their intensity. The user adjusts the perceived intensity of each one of the digits to match an intensity of a respective row 355 by maneuvering a respective slider 352. The GUI 351 allows the operator 203 to indicate which one of the visual effects appears in the exemplary calibration pattern template 350. The GUI 351 comprises a number of controls, such as shown at 352, each designed to adjust one of the separable artifact identifiers of the artifact calibration template 350, as shown at 353.

Optionally, the user is asked to place the calibration pattern template 350 on an image separating mask or to project it thereon. Then, the operator 203 evaluates the intensity for each separable artifact identifier that appears on the printed calibration pattern template 350, and uses a respective control, optionally a slider of the GUI 351, to adjust the visualization of the calibration pattern template 354 that is optionally simulated by the GUI 351. The adjustment defines the visual evaluation by equalizing the intensity of the visualized calibration pattern template 354 with the printed calibration pattern template 351 that is displayed through or projected on the image separating mask. Optionally, the user adjusts the intensity of each one of the simulated separable artifact identifiers resemble to the intensity of a respective separable artifact identifier on the calibration pattern template 350. Then, after the operator 203 has adjusted the simulated calibration pattern template 354 the blur profile is estimated based on the intensities which have been adjusted by the operator 203, optionally by the calibrating module 207, which is described above.

In some embodiments of the present invention, the adjusted intensities are to used for creating a blur profile by a regression analysis, for example as described in relation to equation 4 below, wherein a set of the adjusted intensity values corresponds with a set of the measurements $M_j$. In other embodiments, the blur profile kernel K is computed as a normalization of the measurements $M_j$ to sum 1.

It should be noted that the appearance of the calibration pattern depends on the viewing location of the evaluator 208. Optionally, the input module 206 allows the evaluator 208 to provide her and/or it with a current location. The current location is optionally used for calibrating the one or more interlaced images and/or the visualization of the one or more interlaced images.

Figure 6:
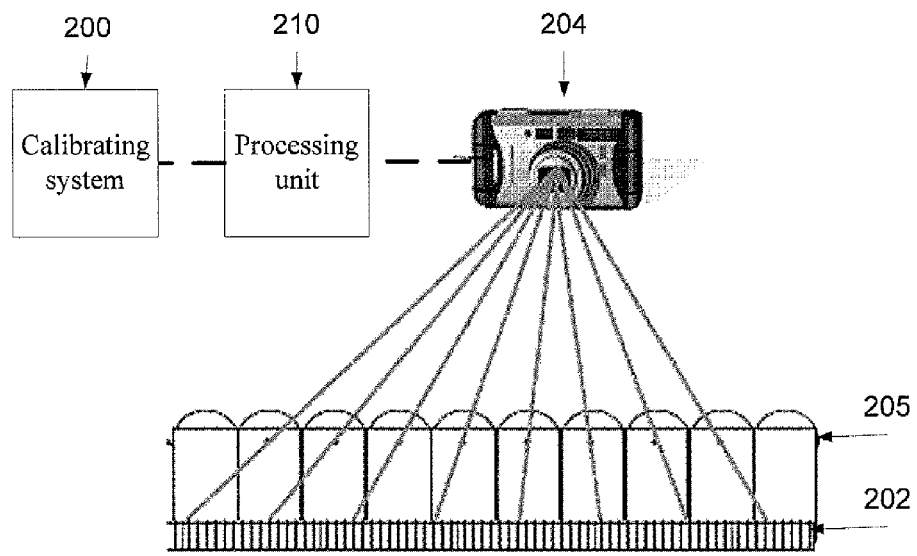
FIG. 6 is a schematic illustration of an image capturing device, a calibration pattern, an image separating mask, and the calibrating system that is depicted in FIG. 1, according to some embodiment of the present invention.

Reference is now also made to FIG. 6 which is a schematic illustration of the image capturing device 204, the calibration pattern 202, the calibrating system 200 and the image separating mask 205, according to some embodiment of the present invention. As depicted in FIG. 6, the image capturing device 204 is connected to a processing unit 210. Optionally, the processing unit 210 is used by the system 200 and the image capturing device 204. As, described above, the evaluator that provides the visual estimation may be a human operator 203 and/or an image capturing device 204. As depicted in FIG. 6, the image capturing device 204 optically measures light that is reflected from the calibration pattern and passes through the image separating mask 205. Optionally, the image capturing device uses the processing unit 210 that receives the light measurements and processes them to estimate the blur profile of the display, for example as described below.

In one embodiment of the present invention, the image capturing device 204 measures the light that is emitted from the calibration pattern that is depicted in FIG. 4. Since the light passes via the image separating mask 205, it is assured that the measured light has been affected by the optical structure of thereof and optionally by its optical aberrations. Optionally, the measured light is affected by other characteristics of the display. For example, when the multi image display includes an image that is printed on an image paper and laminated to the backside of a lenticular lens, then other aspects include the type of paper, the quality of lamination, the type of ink, the half-toning algorithm etc. As described above, in some embodiment of the present invention, the image separating mask 205 includes a lenticular lenses array. Optionally, the pitch of the lenses is provided to the calibrating module 207 in advance. Such data may be stored in the aforementioned database 404 that is connected to the computer network 301 or uploaded by the system operator. Such information is optionally used during the interlacing process which is applied to create the final image for the multi image display.

Figure 7:
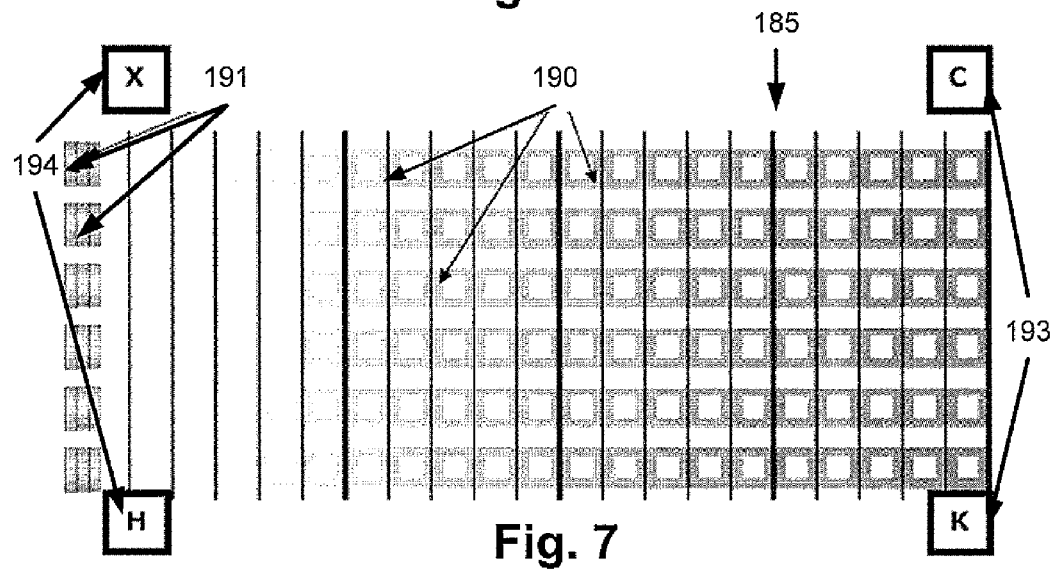
FIG. 7 is an exemplary calibration pattern template which is designed for 1 mage capturing devices, according to some embodiments of the present invention.
Figure 8:
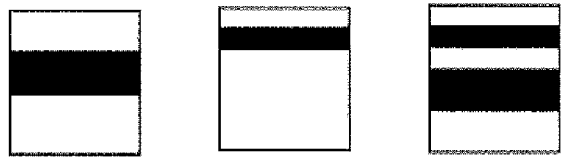
FIG. 8 is a schematic illustration of exemplary changeable calibration tiles which are designed to be placed in the calibration pattern template of FIG. 7, according to some embodiments of the present invention.

In some embodiments of the present invention, the calibration pattern is designed for allowing the image capturing device 204 to measure the light that is emitted therefrom, for example as depicted in FIG. 7 which is an exemplary calibration pattern template 185 and to FIG. 8 that depicts schematic illustrations of the exemplary changeable calibration tiles, according to some embodiments of the present invention. The calibration pattern template 185 is similar to the pattern that is used in FIG. 4; however, this calibration pattern template 185 further comprises an alignment mark in each one of its corners 193, 194 and sets of mutually shifted centering marks 191 for each row. Optionally, the alignment marks cover an area which is similar to the area of 20 lenticules of image separating mask 205. The exemplary changeable calibration tiles of FIG. 8 are similar to the changeable calibration tiles which are used in FIG. 5, however these changeable calibration tiles are rotated 90° degrees before they are placed in the white squares of the calibration pattern template 185. In such a manner, the image separating mask 205, which is optionally a lenticular lens array, may be placed in a manner that the lenticules are oriented horizontally. The tiles are placed in the areas of 190.

First, the calibration pattern template 185 is tiled with the aforementioned changeable calibration tiles, creating a reference image. The reference image, which may be referred to as T, is stored for matching, optionally as described below. The calibration pattern template 185 is also displayed in the multi-view display, for example printed on the back side of a image separating mask such as a lenticular lens array and displayed to the image capturing device 204 via the image separating mask 205, for example as shown at FIG. 6. Now, after T is defined and a respective calibration pattern is displayed in the multi-view display, for example printed, an image of the displayed/printed calibration pattern is captured. Optionally, an alignment is found between the captured image and the reference image. The alignment is optionally identified using the alignment marks 193, 194. In should be noted that the alignment may be found by any many alignment methods which are known in the art. Optionally, the alignment marks 193, 194 are identified using a pattern recognition detecting method, such as image correlation for pattern recognition, see U.S. Pat. No. 5,065,440 issued on Nov. 12, 1991, which is incorporated herein by reference. Then, a transformation between the locations of the four alignment marks 193, 194 in the captured image and the location thereof in the reference image is derived and used for aligning the captured image. Optionally, the captured image is dynamically resampled to produce the aligned captured image, see U.S. Pat. No. 5,594,676 filed on Dec. 22, 1994, which is incorporated herein by reference. It should be noted that such a transformation is known to the skilled in the art and therefore not further discussed herein. For example, see U.S. Pat. No. 6,510,244 filed on Mar. 16, 1999, U.S. Pat. No. 7,175,285 filed on Jul. 29, 2003, U.S. Pat. No. 7,274,832 filed on Nov. 13, 2003, and U.S. Pat. No. 7,113,632 filed on Feb. 20, 2002, which are incorporated herein by reference.

For clarity, the aligned captured image may be referred to as $I_w$.

Now, after the alignment, the blur profile may be calculated. For clarity, the aligned captured image may be referred to as $I_w$.

For each row in the calibration pattern template 185, a square with a changeable calibration tile that has a pattern with closest intensity to the pattern in the proximity thereof. For clarity, each one of the rows in the calibration pattern template 185 may be referred to as $r_k$ where K denotes the number of the row. Given the known locations of the squares, which may be referred to herein as $f_1, \ldots, f_h$, the pattern that appears in the areas of their interior parts and the areas that surround them, which are respectively referred to as $b_1, \ldots, b_h$, and as $O_1, \ldots, O_h$, the average brightness of the interior area in $I_w$, may be calculated as follows:

$$y = \arg_j \min |E_{p \in O_j}[I_w(p)] - E_{p \in b_j}[I_w(p)]| \qquad \text{Equation 1:}$$

where y is an index that minimizes the differences of the average brightness of the surrounding area in $I_w$, and the E denotes an average operator. Now, after y has been calculated, the convolution kernel K of the blur profile is recovered by using regression analysis as described below, where the brightness values of the surrounding areas $O_y$, defined here, correspond to the measurements' values $M_j$, defined below.

Optionally, the evaluator 208 receives an indication of the locations or viewing angle from which the evaluation is supposed to be performed. Optionally, the calibration pattern includes patterns that assist the evaluator 208 to localize her or its position and/or viewing angle in relation to the calibration pattern. Using such patterns for localizing a particular view such as the center view is a standard technique in a lenticular printing process. Such optional processes are known to the skilled in the art and therefore not further described herein.

Optionally, the calibration pattern includes a pattern that allows the evaluator 208 to identify its and/or her location and/or viewing angle. In such an embodiment, the evaluator provides information about her and/or it location and/or viewing angle together with the measurements. Such location information may be acquired, for example, by indicating to the evaluator to identify from several interlaced images which image is viewed in the pattern by allowing her or it to identify characteristics, such as brightness, contrast, location of image features and ghosting in the images or by allowing it to use a pattern recognition algorithm such as correlation. In such an embodiment, the appearance of the calibration pattern depends on the viewing location and/or viewing angle of the user. Optionally, the calibration pattern includes one or more templates that assist the evaluator to localize her and/or it position in relation thereto.

Optionally, the calibration pattern includes a banding pattern. As commonly known, optical banding artifacts are an undesired artifact of multi image display.

Optical banding artifacts may indicate that the pitch of an image separating mask is not calibrated with the interlaced image that is attached thereto or projected thereon and/or may indicate inaccuracies of a printing/displaying process.

Figure 11:
FIG. 11 is a banding calibration pattern that depicts a repeating pattern of black lines which are positioned in a constant distance from one another, according to some embodiments of the present invention.

Optionally, the imaging unit 201 is used for printing a banding calibration pattern 370 that depicts a recurrent pattern of black lines where each line is positioned in a constant distance from another line, for example as shown at FIG. 11. The evaluator 208 now evaluates characteristics of the banding effect, such as the extent of the banding and the shift thereof, which are reflected from the banding calibration pattern 370 and uses the input module 206 for inputting the visual estimation. Optionally, the input module 206 displays a GUI, such as one or more sliders that allows the evaluator 208 to easily input his visual estimation, similarly to the usage of the calibration pattern that is depicted in FIG. 4.

Figure 12:
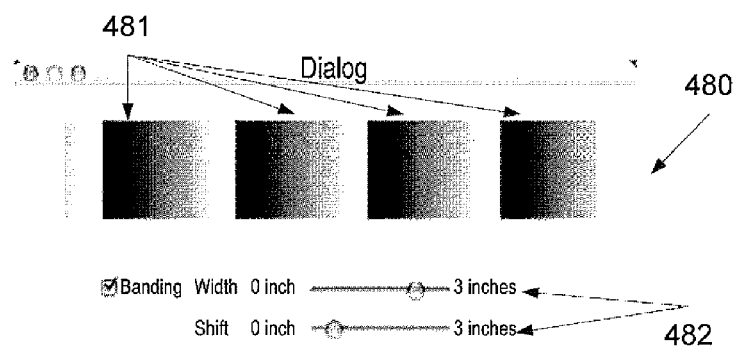
FIG. 12 is a GUI that includes one or more patterns that simulates a banding effect and displayed to the evaluator, according to some embodiments of the present invention.

In another embodiment, as shown at FIG. 12, a GUI 480 that includes one or more patterns 481 that simulate the banding effects is displayed to the evaluator 208, which is optionally the operator 203. The evaluator 208, which is optionally the operator 203, visually evaluates whether she sees banding effects or not and optionally uses one or more sliders 482 for defining characteristics of the banding effect. The one or more patterns 481 respond to adjustments which are made by the sliders. The adjustments have been forwarded to the calibrating module 207 that defines a banding profile for calibrating one or more images, as described above. The estimated size of the banding profile can be used for reducing the banding effect, for example by simulating a similar banding in input images, for example by presenting a sequence of images that depicts a transition where the transition has one or more characteristics which have been indicated by the user.

Figure 13:
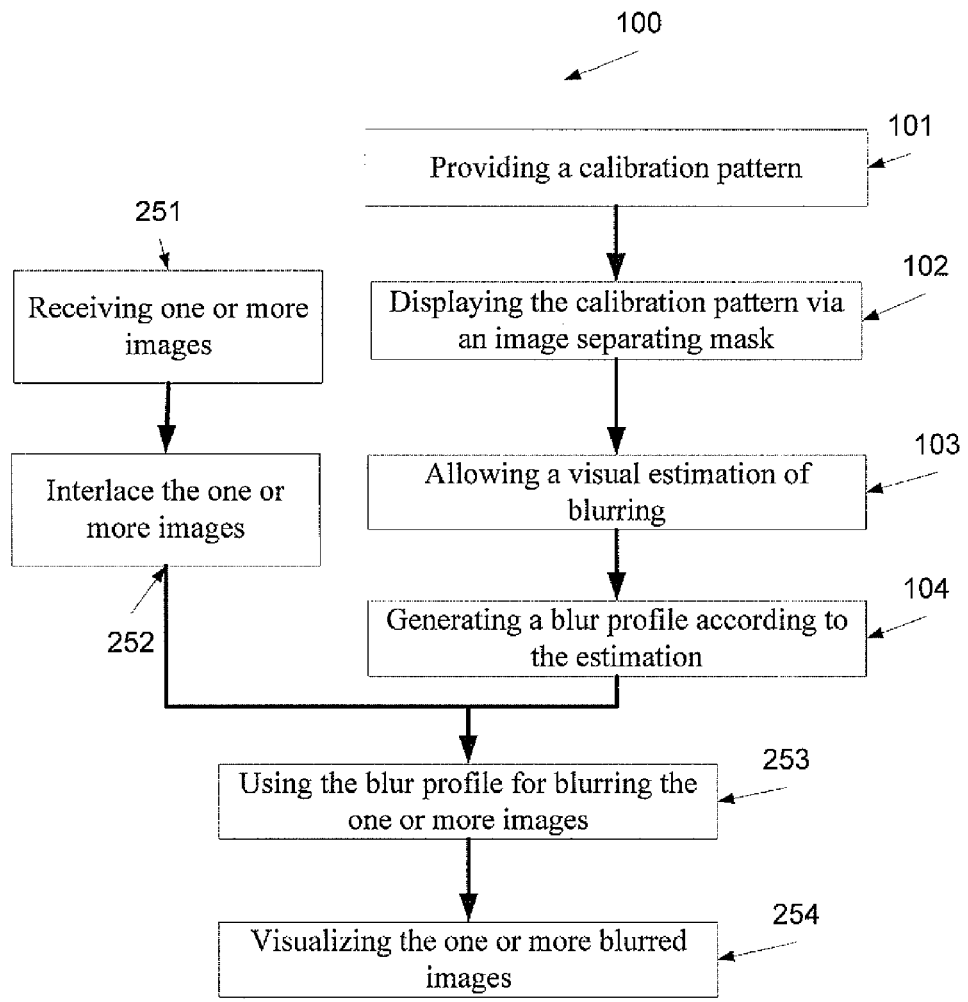
FIG. 13 is a flowchart of a method for visualizing a multi image display, according to some embodiments of the present invention.

Another possible use for the banding profile, is avoiding one or more areas that include more than one optical banding artifact. In such a manner, the transition from one view to another starts from one side of the image and progresses to another size. For example, if the images are designed to be printed on a lenticular lenses array having 2×2 inches and the user indicates that the banding effect is approximately 2.5 inches wide the 2×2 images can be placed such that banding effects will only occur at the spaces between the 2×2 inch images and not in the images themselves Reference is now made to FIG. 13, which is a flowchart of a method for visualizing a multi image display, according to some embodiments of the present invention. Blocks 101-104 are as depicted in FIG. 1, however FIG. 13 further depicts a number of blocks that allows the visualization of a multi image display of one or more images, such as interlaced images.

As shown at 251, one or more images that are to be presented simultaneously to different viewing directions, optionally as defined above, are received. Then, as shown at 252, the images are optionally interlaced. Then, as shown at 253, the one or more of the interlaced images are blurred using the blur profile that has been calculated in 101-104. Optionally, the blur profile is defined as a convolution filter and the blurring is performed by convoluting it over the interlaced image. Now, as shown at 254, the one or more blurred interlaced images are visualized. Optionally, the blurred interlaced images are de-interlaced optionally by collecting and/or interpolating the relevant columns from the one or more blurred interlaced images.

As the images are optionally de-interlaced for the visualization, the computational complexity of the process may be reduced. Optionally, only one or more segments of the one or more received images are interlaced; there is no need to create the entire interlaced image. For example, one may create each a portion of the interlaced image and blur only a portion thereof.

In some embodiments of the present invention, the emulation of the multi image display is implemented by a set of semi transparent images. The emulated multi image display is defined as follows:

$$v = \sum_{k=1}^{n} s_k * v_k \qquad \text{Equation 2}$$

where, $v_1, \ldots, v_n$ denotes n semi transparent images corresponding to a set of views that are to be presented in the multi-view display and $s_1, \ldots, s_n$ denotes n respective intensity of the respective semi transparent image in which one embodiment correspond to the values of the kernel K in the blur profile and v denotes an emulated multi-image display view.

Optionally, the blur profile is recovered using regression analysis. In some embodiments of the present invention, a set of convolution coefficients is recovered using a least squares regression process. For clarity, each one of $M_1, \ldots, M_k$ denotes a member of a set of measurements, each corresponding with a measurement that has been identified by the evaluator and each one of $P_1, \ldots, P_k$ denotes a member of a set of template vectors. In such an embodiment, the calibration pattern optionally comprises a number of printed templates; each consists of a set of uniform columns. Each one of the template vectors contains intensity values of the printed template columns. The convolution kernel, for clarity denoted by K, may be recovered by solving the following set of linear equations:

$$\sum_{x} K(s-x)P_j(x) = M_j \qquad \text{Equation 4}$$

where j=1 ... K and s denotes the viewing location of the user.

Optionally, the aforementioned set of measurements $M_1, \ldots, M_k$ is determined according to the values which are adjusted by operator 203, for example according to the intensities which are defined by the rectangle selected by the operator for each row as depicted in FIG. 4 and described above, and the template vectors $P_1, \ldots, P_k$ correspond with a respective separable artifact identifier that is presented to the operator, optionally as described above. In such an embodiment, if the $j^{th}$ separable artifact identifier appears in view i, than $P_i[j]=1$, else $P_i[j]=0$.

Optionally the aforementioned set of measurements $M_1, \ldots, M_k$ is determined according to the values, which are adjusted by operator 203 according to the intensities which are defined by the sliders of the GUI that is depicted in FIG. 10 and described above.

Optionally, the blurring, which is performed at 253, is made using a linear modeling. The blur profile, which is optionally a convolution kernel, simplifies the measurement process, for example as defined in International Patent Application IL2008/000060 filed on Jan. 15, 2008, which is incorporated herein by reference.

The calibration pattern, which is optionally as shown at FIGS. 4 and 5, consists a set of uniform columns and each one of the template vectors $P_1, \ldots, P_k$ contains the intensity values of the printed template columns. Optionally, a general linear blur function, which is optionally defined as a linear function having several basis functions, is defined. Optionally, the linear function is implemented as a shift-invariant blur function that is based on the convolving of a convolution kernel K that is given as a linear combination of t basis kernels $K_i$:

$$K = \sum_{i=1}^{t} a_i K_i \qquad \text{Equation 5}$$

Optionally, the set of basis functions includes interpolating functions such as splines, polynomials, Gaussians with a zero mean and a different variance, and the like.

K is calculated by recovering the following set of equations:

$$\sum_{i=1}^{t} a_i \sum_{x} K_i(s-x)P_j(x) = M_j \qquad \text{Equation 6}$$

where as j=1 ... K, $a_1$ ... $a_l$ denotes a set of linear coefficients that are solved in the equations and s denotes the viewing location of the user, optionally as defined above. Optionally, the blurring, which is performed at 253, is made using a non-linear modeling. In such an embodiment, a number of convolution kernels are used, for example as follows:

$$k \exp\left(\frac{x^\alpha}{\beta}\right) \quad \text{Equation 7}$$

where α and β are the parameters and k is a normalization factor which is used for normalizing a filter sum, for instance to 1. Optionally, a number of filters are used, optionally including Gaussian filters.

Figure 14:
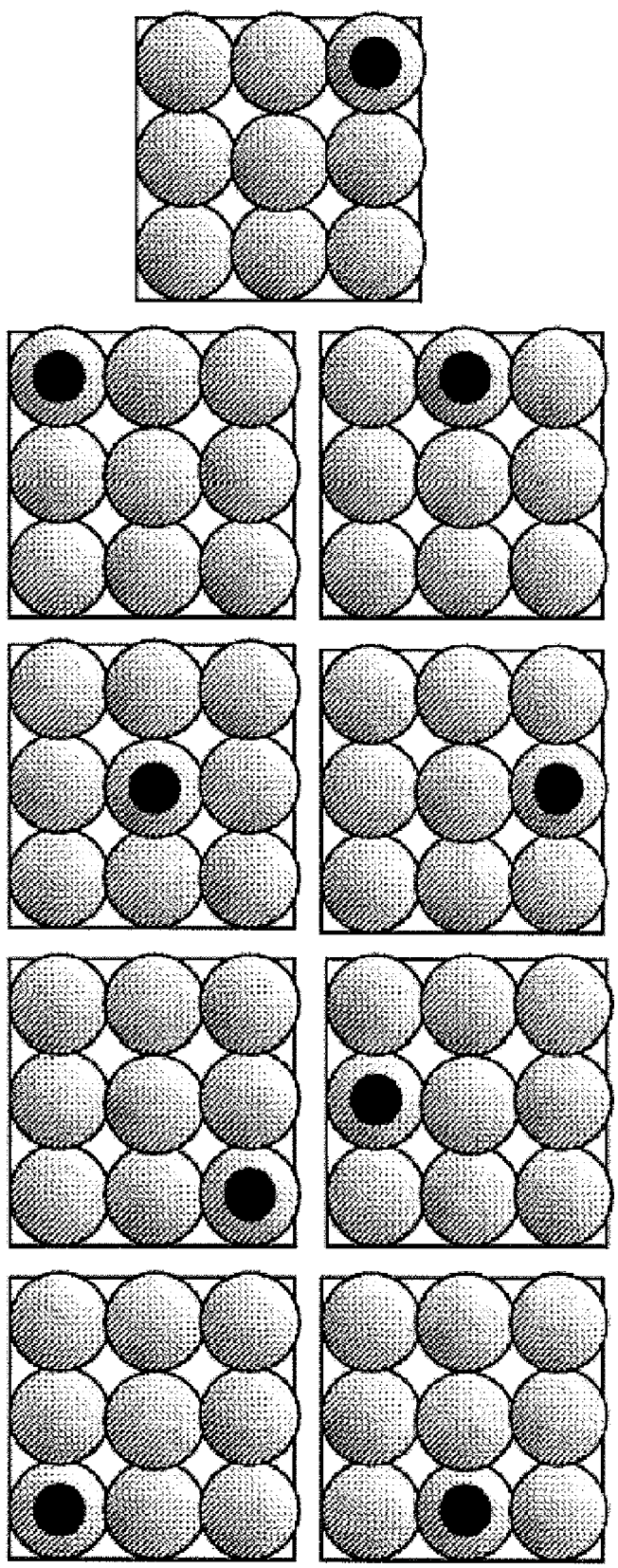
FIG. 14 is a schematic illustration of a set of images of nine gradient patterns arranged in a rectangular, according to some embodiments of the present invention.

Optionally, a blur profile may be defined with a small number of parameters, preferably 1-2 parameters. The blur profile can be estimated as follows:
a. Providing a calibration pattern that is attached and/or printed behind an image separating mask. An example for such a calibration pattern is an interlaced image that is based on a set of images, optionally as shown at FIG. 14, which is an exemplary schematic illustration of a set of images of nine circular gradient patterns, arranged in a rectangular, according to some embodiments of the present invention. Each image comprises a dot at a different circle
b. Displaying to the evaluator one or more simulations of the calibration pattern, each simulation with a different blur.
c. Allowing the evaluator to select one of the simulations which resemble to the provided calibration pattern more than other simulations. Optionally the picked simulation is used for setting the blur profile.

Reference is now made, once again, to FIG. 1. Optionally, the one or more simulations are presented to the evaluator using a display device, such as a screen. Optionally, the evaluator can use the input module 206 to adjust one or more blur parameters of the simulations and to visually evaluate its and/or her adjustment. Optionally, the input module 206 is a GUI that is displayed on the aforementioned imaging unit 201 or display device. Such a GUI optionally includes virtual sliders, combo boxes, virtual knobs, and/or any other graphic tools that may be used for adjusting the blur. Optionally, the imaging unit 206 is designed to output a plurality of prints, each simulates a blur that is defined by a different set of parameters.

As described above, the calibrating system 200 is designed to calculate a blur profile which may be used for creating a blur filter. Such a blur filter may be used for reducing artifacts such as optical blur artifacts which are caused by image separating masks, for example by lenticular lens array. Optionally, the blur profile may be used for reducing and/or eliminating one or more ghosting artifacts. As used herein, a ghosting artifact means a visual effect in which an image appears to also include elements of at least another image. In a lenticular lens array, light impinging on the lenticules is reflected throughout the lenticular material. Given the convex shape of the lenticules, the light reflects at different angles. This means that even though theoretically only one segment of the printed image is supposed to be viewed for a given viewing angle, the light reflects off other segments of the image so that they, too, may appear to some extent to the viewer.

Ghosting artifacts, which are expressed as blurriness of in-depth objects in 3D images or as overlay of at least one image on another image, are optionally modeled according to the blur profile. Optionally, the ghosting artifacts are reduced from images which are designed to be displayed in a multi image display, such as interlaced images. Optionally and/or alternately, the ghosting artifacts are reduced from images which are designed to be used for creating interlaced images or from segments of images which are designed to be used for creating interlaced images.

The ghosting artifacts may be reduced, according to the blur profile, in process which may be referred to herein as a de-ghosting process and/or de-blurring process. Optionally, the values of pixels in an interlaced image are linearly combined so that at least one of the coefficients is negative. In such a manner, the combined effect of the de-ghosting process and of the blur that is created by the image separating mask, which is optionally a lenticular lens array, is significantly lower than the blur that is created without the de-ghosting process.

Optionally, the de-ghosting process is an iterative process which is defined as follows:

$$I^{(0)} = I \quad \text{Equation 8}$$
$$I^{(j+1)} = I^{(j)} + s \cdot g(I - f(I^{(j)}))$$

where I denotes an interlaced image, f denotes a convolution kernel of a modeled lenticular blur process, such as the kernel K shown in equations 4, 5, g denotes a blur operator that is optionally be equal to f, s denotes a size which is defined to maintain the interlaced image in a predefined range, for example between 0 and 255 for a 8-bit image, and the image $I^{(n)}$ denotes the result of the process which is computed at the last iteration. Optionally, g=f if f is symmetrical.

Optionally, the number of iterations is predefined. Optionally, the number of iterations is dynamically determined according to a halt criterion that may be defined according to the size of s.

In some embodiments of the present invention, the multi-view display requires an image with halftone format. As used herein, a halftone format means any photomechanical printing surface or the impression therefrom in which detail and tone values are represented by a series of dots in varying size and shape, varying in direct proportion to the intensity of tones they represent. An example for such a multi image display is provided in U.S. Pat. No. 6,061,179 that is incorporated herein by reference or in a multi image display such as a lenticular lenses array having one or more images which are attached thereto or printed thereon. Usually, a halftone format, is a format wherein each pixel is represented with a low number of bits. The halftoning or halftone screening process may be used for reproducing an image with a high quality, see for example U.S. Pat. No. 5,107,346 filed on 13 Apr. 1990 and U.S. Pat. No. 5,991,438 filed on 22 Feb. 2002 which are incorporated herein by reference. One example is a printed lenticular display that is produced by a printing device and/or a copying device that receives one or more halftone images as input.

Optionally, the de-blurring or de-ghosting is performed as a halftoning process that takes into account the blur profile of the multi-view display. Optionally, the halftoning process is implemented using a least squares halftoning algorithm that is defined according to a modulation transfer function (MTF) and/or a filter that is based on the impulse response of a finite impulse response (FIR) filter, for example as described in U.S. Pat. No. 5,475,497, which is incorporated herein by reference. In such an embodiment, the de-ghosting filter is based on a product of two one-dimensional filters. The first one-dimensional filter is the blur profile or any filter that is derived therefrom and the second-one dimensional filter is an impulse response for a filter which is used in modeling human visual perception, for example as FIGS. 3 and 4 of U.S. Pat. No. 5,475,497, which is incorporated herein by reference.

It is expected that during the life of a patent maturing from this application many relevant apparatus, methods, and systems will be developed and the scope of the terms sequence, image camera, network, and communication are intended to include all such new technologies a priori.

As used herein the term "about" refers to □ 10%.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, to described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for calibrating a multi image display with a first image separating mask by reducing at least one ghost artifact resulting from a blur brought about by said multi image display separating mask, comprising:
    a) displaying a calibration pattern through a second image separating mask;
    b) allowing a human observer to provide a visual estimation indicating a blur brought about to said calibration pattern by said second image separating mask; and
    c) generating a blur profile of at least said first image separating mask according to said visual estimation;
    d) calibrating said multi-image display by reducing at least one artifact brought about at least by said first image separating mask by processing content of at least one image using said blur profile; and
    wherein said first and second image separating masks having a substantially similar optical profile;
    wherein said at least one artifact is selected from a group consisting of: a ghosting artifact, a bleed artifact, an edge acuity artifact, a banding artifact, and a gloss non-uniformity artifact;
    wherein said blur profile is used for at least one of reducing said at least one artifact from the multi image display and emulating the appearance of at least one image in said multi-image display.

2. The method of claim 1, wherein said blur profile includes a convolution kernel.

3. The method of claim 1, wherein said reducing is performed by using the blur profile in a halftoning process.

4. The method of claim 1, further comprising combining said blur profile and a filter used in modeling human visual perception.

5. The method of claim 1, further comprising creating a member selected from a group consisting of: a blur filter, an image blurring transformation, an image conversion function and processing at least one image according to said member.

6. The method of claim 1, wherein second image separating mask is the first image separating mask.

7. The method of claim 1, wherein said calibration pattern is printed, said calibration pattern having a printing blur brought about by at least one printing artifact of said optical profile.

8. The method of claim 1, wherein said image separating mask is selected from a group consisting of: a lenticular lens array, an optical barrier, a parallax bather, an array of lenses for integral photography, and any display for displaying a multi dimensional image.

9. The method of claim 1, further comprising receiving location information of said human observer before said c), said generating being performed according to said location information.

10. The method of claim 1, wherein said calibration pattern comprises at least one location label, said allowing further comprises allowing a location estimation of said location information according to the visibility of said at least one location label from a certain location.

11. The method of claim 1, wherein said calibration pattern comprises a banding pattern, further comprising generating a banding profile configured for calibrating at least one image of the multi image display according to said visual estimation.

12. A system for calibrating a blur profile of a multi image display with a mask by reducing at least one artifact resulting from a blur brought about by said multi image display separating mask, comprising:
   a processor;
   an input module configured for receiving a visual estimation from a human observer of a blur brought about to a calibration pattern by at least an image separating mask;
   a blur profile module configured for generating the blur profile according to said visual estimation using said processor; and
   an output unit for outputting the blur profile, thereby allowing calibrating a multi-image display by at least one of reducing an artifact brought about at least by said image separating mask, said calibrating is performed by processing content of at least one image using said blur profile;
   wherein said at least one artifact is selected from a group consisting of: a ghosting artifact, a bleed artifact, an edge acuity artifact, a banding artifact, and a gloss non-uniformity artifact;
   wherein said blur profile is used for at least one of reducing said at least one artifact from the multi image display and for emulating the appearance of at least one image in said multi-image display;
   wherein said first and second image separating masks having a substantially similar optical profile.

13. The system of claim 12, wherein said image separating mask having an optical profile, said multi image display having an additional image separating mask having said optical profile, said multi image display being formed by displaying said at least one calibrated image through said additional image separating mask.

14. The system of claim 13, wherein said optical profile is configured for defining a member selected from a group consisting of: a pitch, a curvature, a refractive index shape, a relative location of the lenticular lenses, a transparency, a paper type, adhesive type, and printer type.

15. The system of claim 12, further comprising a client interface configured for generating a visualization of said multi image display and sending said visualization to a client terminal via a network, thereby allowing a user to view said visualization.

16. The system of claim 15, wherein said client interface is configured for receiving a generation authorization from said user via said network and generating the multi image display according to said generation authorization.

17. The system of claim 15, wherein said client terminal is remotely located from said system.

* * * * *